United States Patent [19]

Shigemitsu

[11] Patent Number: 4,562,221

[45] Date of Patent: Dec. 31, 1985

[54] POLYAMIDE RESIN COMPOSITION EXCELLENT IN PLATE ADHESION

[75] Inventor: Hideyuki Shigemitsu, Tokyo, Japan

[73] Assignee: Mitsubishi Rayon Co., Ltd., Tokyo, Japan

[21] Appl. No.: 625,255

[22] Filed: Jun. 27, 1984

[30] Foreign Application Priority Data

Jun. 30, 1983 [JP] Japan .................................. 58-118814

[51] Int. Cl.$^4$ ................................................ C08K 3/34
[52] U.S. Cl. ..................................... 524/456; 524/606; 524/404
[58] Field of Search ........................... 524/456; 428/458

[56] References Cited

U.S. PATENT DOCUMENTS

| | | | |
|---|---|---|---|
| 3,830,777 | 8/1974 | Burton | 524/456 |
| 4,131,591 | 12/1978 | MacFarlane | 524/456 |
| 4,415,699 | 11/1983 | Nield et al. | 524/456 |
| 4,452,858 | 6/1984 | Take et al. | 524/456 |

FOREIGN PATENT DOCUMENTS 0056986  8/1982  European Pat. Off. ............ 524/456

*Primary Examiner*—Lewis T. Jacobs
*Attorney, Agent, or Firm*—Cushman, Darby & Cushman

[57] ABSTRACT

A polyamide resin composition excellent in plate adhesion which comprises 35% to 90% by weight of a polyamide resin, 5% to 60% by weight of an inorganic fiber and 5% to 50% by weight of wollastonite.

2 Claims, No Drawings

POLYAMIDE RESIN COMPOSITION EXCELLENT IN PLATE ADHESION

The present invention relates to a polyamide resin composition improved in plate adhesion.

Currently, it has become possible to enhance the stiffness of polyamide resin to a great extent by adding carbon fiber thereto, and today such a product is regarded as substitutive for metals. However, molded article produced therefrom has a black appearance and is unsuitable for use as an exterior material. Metallic coating, which may be one of the ways for overcoming this fault, is impossible in this case because a polyamide resin containing inorganic fiber cannot be etched with acid type of simple etching solutions used in the prior plating processes. If an etching solution having a higher acid concentration is used or if the etching is performed for too long a period of time, the resin is excessively etched to make bare the inorganic fibers which extremely deteriorates the appearance of the product.

With the aim of solving the above-mentioned problem, the present inventor conducted many studies to discover that a polyamide resin composition into which a specified quantity of wollastonite has been compounded can be etched with conventional etching solutions and thereby it exhibits an excellent plate adhesion. Based on this discovery, the present invention was accomplished.

Thus, the present invention provides a polyamide resin composition excellent in plate adhesion which comprises 35 to 90% by weight of a polyamide resin, 5 to 50% by weight of an inorganic fiber and 5 to 50% by weight of wollastonite.

The polyamide resin used in the present invention is a self-polycondensate of lactam, a polycondensate of diamine and dibasic acid, a self-polycondensate of $\omega$-amino acid or a copolymer thereof, such as nylon 6, nylon 11, nylon 66, nylon 6-10 and nylon 6-66. Among these polyamide resins, nylon 6 and nylon 66 are particularly preferable in the point of heat-resistance, mechanical strength and stiffness, though these polyamide resins are not critical.

The content of the polyamide resin in the total resin composition is 35 to 90% by weight. If it is lower than 35% by weight, moldability and physical properties of the composition are deteriorated. If it is higher than 90% by weight, the inorganic fiber and the wollastonite can hardly improve the physical properties of the composition.

The polyamide resin may also contain a heat deterioration inhibitor, a nucleating agent, a mold release and the like, if desired.

The inorganic fibers usable in the present invention include carbon fiber, boron fiber, glass fiber, ceramic fiber, metal fiber and the like. The content of the inorganic fiber is 5 to 60% by weight. If it is lower than 5% by weight, the improvement in stiffness is small. If it is higher than 60% by weight, appearance of the molded article is deteriorated.

The wollastonite usable in the present invention is that having a particle diameter of 10 $\mu$m or less. A fine particle having a particle diameter of 5 $\mu$m or less is particularly preferable when an importance is attached to appearance of the plating. The content of the wollastonite is in the range of 5 to 50% by weight. If it is lower than 5% by weight, the adhesion of the composition to the plating is extremely low. If it is higher than 50% by weight, the resin composition is poor in moldability and the surface appearance of the molded article therefrom is not good.

It is a surprising fact that compounding a specified quantity of wollastonite to a composition comprising a polyamide resin and an inorganic fiber, according to the present invention, brings about such high an effect as has not been expected hitherto on the improvement of plate adhesion. This is considered attributable to that the conventional etching solution used in the present invention etches not only the polyamide resin layer but also the wollastonite so that unevennesses effective for the adhesion of plating are formed in the surface layer of molded article.

Although the content of wollastonite used in the present invention depends on the content of inorganic fiber, the total quantity of inorganic fiber and wollastonite should be so controlled as to fall in the range not exceeding 65% by weight.

In the present invention, the conditions for the etching of polyamide resin composition are as follows. Thus, as the etching solution, 3N-hydrochloric acid or a mixed solution of hydrochloric acid and stannic chloride is preferably used, though the etching solution may also be other acid such as sulfuric acid, or an alkali, or a solvent. The temperature of the treatment is in the range from room temperature to about 60° C. The duration of the treatment is in the range of about 1 minute to about 30 minutes.

The use of polyamide resin reinforced with an inorganic fiber such as carbon fiber has been hitherto limited to bearings and some other uses requiring no beautiful appearance. However, plated products obtained from the resin composition of the present invention are useful as various articles such as spring rim and wheel of bicycle and automobile, shaft of tennis racket and golf club, fishing reel, spectacle frame, and the like.

Referring to the following examples, the present invention will be illustrated more concretely.

EXAMPLES 1 and 2

Flat plates were prepared by injection-molding various polyamide resins containing 30% by weight of carbon fiber and 20% by weight of wollastonite, and the flat plates were formed into test samples. Each test sample was etched with 3N hydrochloric acid at 30° C. for 15 minutes and washed with water, after which it was dipped in a catalyst solution ("Catalyst A-30", trade name, manufactured by Okuno Seiyaku Co., Ltd.) at 30° C. for 2 minutes to attach the catalyst to the test sample. After washing it with water, the test sample was dipped in an accelerator solution (10% by volume of hydrochloric acid prepared by mixing 1 part by volume of concentrated hydrochloric acid with 9 parts by volume of water; hereinafter the same) at 40° C. for 3 minutes. Then the test sample was washed with water, dipped in a 10% (by weight) aqueous solution of sodium hydroxide at room temperature for one minute and again washed with water, after which it was dipped in an electroless copper plating solution ("N-100", trade name, manufactured by Okuno Seiyaku Co., Ltd.) at 30° C. for 10 minutes to perform an electroless copper plating. Then the test sample was plated in an electroplating copper solution comprising 200 g/liter of copper sulfate, 50 g/liter of sulfuric acid and 1 ml/liter of gloss agent ("Cupracid, trade name, manufactured by Schering Corp.) for 60 minutes, at a liquid temperature of 20° C. and at a current density of 4 A/dm$^2$ to deposit thereon a copper plating layer having a thickness of about 40 μm. The product thus plated was heat-treated for one hour in a hot air oven kept at 80° C. and then cooled to room temperature, after which its peeling strength was measured.

COMPARATIVE EXAMPLES 1 and 2

Flat plate were prepared in the same manner as in Example 1, except that the used polyamide resin contained 30% by weight of carbon fiber only. The plates were subjected to the same pretreatment as in Example 1 and then plated under the same conditions as in Example 1.

COMPARATIVE EXAMPLE 3

A flat plate was prepared in the same manner as in Example 1, except that the used polyamide resin contained 30% by weight of carbon fiber and 20% by weight of talc (50% by weight in the total). The plate was subjected to the same pretreatment as in Example 1 and then plated under the same conditions as in Example 1.

COMPARATIVE EXAMPLE 4

A flat plate was prepared in the same manner as in Example 1, except that the used polyamide resin contained 40% by weight of wollastonite only. The plate was subjected to the same pretreatment as in Example 1 and then plated under the same conditions as in Example 1.

The plated products obtained in Examples 1 to 2 and Comparative Examples 1 to 4 were evaluated. The results are shown in the following table.

|  | Example 1 | Example 2 | Comparative Example 1 | Comparative Example 2 | Comparative Example 3 | Comparative Example 4 |
|---|---|---|---|---|---|---|
| Kind of polyamide resin | Nylon 6 | Nylon 66 | Nylon 6 | Nylon 66 | Nylon 6 | Nylon 6 |
| Kind of filler | Wollastonite Carbon fiber | Wollastonite Carbon fiber | Carbon fiber | Carbon fiber | Talc Carbon fiber | Wollastonite |
| Strength of adhesion* (kg/cm) | 1.5 | 1.2 | 0.1 | 0.0 | 0.1 | 1.5 |
| Bending modulus (kg/cm$^2$) | 183,000 | 201,000 | 171,000 | 192,000 | 222,000 | 113,000 |
| Appearance of plating | Good | Good | Good | Bulging at the time of plating | Good | Good |
| Thermal cycle test** | Good | Good | Bulging | Bulging | Bulging | Good |

*Strength of adhesion was measured by a peeling test. Thus, the force necessary for perpendicularly peeling off a plating film having a width of 2.5 cm was measured, from which the force per a width of 1 cm was calculated.
**In the thermal cycle test, the following cycle was repeated three times:

```
⎧ −40° C.            1 hour
⎪ Room temperature  15 minutes
⎨ 120° C.            1 hour
⎩ Room temperature  15 minutes
```

What is claimed is:

1. A polyamide resin composition excellent in plate adhesion which consists essentially of 35% to 90% by weight of a polyamide resin, 5% to 60% by weight of a carbon fiber and 5% to 50% by weight of wollastonite.

2. A polyamide resin composition excellent in plate adhesion which consists essentially of 35% to 90% by weight of a polyamide resin, 5% to 60% by weight of a carbon fiber, 5% to 50% by weight of wollastonite and the total quantity of the carbon fiber and the wollastonite is 65% by weight or less.

* * * * *